United States Patent
Schell et al.

(10) Patent No.: US 10,302,529 B2
(45) Date of Patent: *May 28, 2019

(54) OPTICAL CONNECTOR POLARITY AND LOSS MEASUREMENT USING AN INTEGRATING SPHERE-EQUIPPED OPTICAL MEASUREMENT DEVICE

(71) Applicant: Fluke Corporation, Everett, WA (US)

(72) Inventors: J. David Schell, Austin, TX (US); Seymour Goldstein, Austin, TX (US); Piotr Anatolij Levin, Vilnius (LT)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,003

(22) Filed: Jan. 8, 2018

(65) Prior Publication Data

US 2018/0266918 A1 Sep. 20, 2018

Related U.S. Application Data

(63) Continuation-in-part of application No. 15/462,645, filed on Mar. 17, 2017.

(51) Int. Cl.
*H04B 10/079* (2013.01)
*G01M 11/00* (2006.01)
*G02B 6/42* (2006.01)

(52) U.S. Cl.
CPC ...... *G01M 11/337* (2013.01); *G01M 11/3181* (2013.01); *G01M 11/35* (2013.01); *G02B 6/42* (2013.01); *H04B 10/07955* (2013.01)

(58) Field of Classification Search
None
See application file for complete search history.

(56) References Cited

U.S. PATENT DOCUMENTS 8,692,984 B2 4/2014 Schell et al.
8,908,167 B2 12/2014 Flora et al.
(Continued)

FOREIGN PATENT DOCUMENTS

DE 3643696 A1 6/1988

OTHER PUBLICATIONS

Hamamatsu, "InGaAs PIN photodiode arrays, G12430 series, 16/32/46 element InGaAs array for near IR detection," Hamamatsu Photonics K.K., Solid State Division, Cat. No. KIRD1124E03, Jul. 2016; 7 pgs.

(Continued)

*Primary Examiner* — Kenneth N Vanderpuye
*Assistant Examiner* — David W Lambert
(74) *Attorney, Agent, or Firm* — Seed IP Law Group LLP

(57) ABSTRACT

An integrating sphere-equipped optical measurement device and optical connector polarity and type identification and loss measurement are provided. The optical measurement device includes at least two photodetectors that are optically responsive over different ranges of wavelengths. The optical measurement device receives one or more optical signals emanate from optical fibers of an optical fiber cable. The optical measurement device determines an optical intensity or loss of the one or more optical signals based on a measurement made by a corresponding photodetector whose responsivity range includes a wavelength of the one or more optical signals. The optical measurement device determines one or more respective positions where the one or more optical signals impinged on a sensor. The optical measurement device determines a polarity of the optical fiber cable based on both the one or more positions and one or more transmitting positions of the one or more optical signals, respectively.

20 Claims, 10 Drawing Sheets

(56) References Cited

U.S. PATENT DOCUMENTS

| | | | |
|---|---|---|---|
| 9,518,892 B1 | 12/2016 | Schell | |
| 2002/0105739 A1* | 8/2002 | Minneman | G02B 6/4214 359/838 |
| 2003/0202176 A1* | 10/2003 | Ohta | G01J 1/42 356/224 |
| 2007/0051881 A1* | 3/2007 | Ashdown | G01J 3/10 250/226 |
| 2008/0297771 A1* | 12/2008 | Ou | G01J 1/02 356/73 |
| 2009/0257748 A1* | 10/2009 | Nemoto | H04B 10/07957 398/49 |
| 2013/0201321 A1* | 8/2013 | Chao | G01J 1/0474 348/79 |
| 2016/0334285 A1* | 11/2016 | Celikel | G01J 1/0448 |

OTHER PUBLICATIONS

Horiba Scientific, "Symphony II Linear Extended InGaAs Array," retrieved from http://www.horiba.com/scientific/products/optical-spectroscopy/detectors/scientific-cameras-for-spectroscopy-cdd-ingaas-emccd/ingaas/; 2 pgs.

OSI Optoelectronics, "4×4 Silicon Array Detectors," retrieved from http://www.osioptoelectronics.com/standard-products/silicon-photodiodes/photodiode-arrays/two-dimensional-photodiode-array.aspx; 4 pgs.

Princeton Infrared Technologies, "PIRT1280A1-12 InGaAs 1280×1024×12 µm Focal Plane Array," Doc. No. 3110-0007, Ver. 2, Dec. 10, 2016 ; 2 pgs.

UTC Aerospace Systems, "LC-Series Extended Wavelength InGaAs Linear Photodiode Arrays," Model No. LC-Series, Doc. No. 4110-0165, Rev. 4, Jan. 2016; 2 pgs.

ANSI/TIA-568-C.0, "Generic Telecommunications Cabling for Customer Premises," Feb. 2009; 70 pgs.

Jouni Envall et al., "Measurements of fibre optic power using photodiodes with and without an integrating sphere", *Metrologia* (41), Institute of Physics Publishing, Jul. 5, 2004, pp. 353-358.

Extended European Search Report dated Sep. 17, 2018, for corresponding European Application No. 18162412.3-1220, 6 pages.

\* cited by examiner

OPTICAL CONNECTOR POLARITY AND LOSS MEASUREMENT USING AN INTEGRATING SPHERE-EQUIPPED OPTICAL MEASUREMENT DEVICE

BACKGROUND

Technical Field

This application is directed to an optical measurement device for determining optical connector polarity, optical signal loss, optical connector contamination and/or optical connector type and, in particular, to an optical measurement device that is equipped with an integrating sphere and a plurality of photodetectors.

Description of the Related Art

Conventional devices that measure optical signal intensity and/or optical array polarity utilize an optical detector that is coupled individually to each optical fiber of the optical array. A conventional device may be used to measure the optical intensity of an optical signal transmitted through each optical fiber of the array. However, the need to couple the device to each optical fiber individually in order to obtain an intensity measurement is time consuming.

Some conventional devices are equipped with a multiple sensors, whereby each sensor captures an optical signal received from a respective optical fiber of the array. For these devices to work properly, the sensors must be respectively aligned with the optical fibers. Due to the fact that optical array connectors, such as multi-fiber push-on (MPO) connectors, are gender-specific (i.e., pinned or unpinned), a gender-compliant device is required in order to attach the device to the connector and ensure alignment. Thus, personnel performing field tests on optical arrays may need to carry multiple devices for both genders. The alternative use of patch cords to reverse gender may introduce artifacts in measurement results and adds uncertainty. Furthermore, these devices are only usable for optical arrays of a certain size (having specific number of rows or columns of optical fibers). They may not be used to test a multitude of other commercially available arrays that differ in terms of the number of rows or columns of optical fibers than for which the device is designed.

BRIEF SUMMARY

In an embodiment, an optical measurement device includes an integrating sphere configured to receive one or more optical signals that respectively emanate from one or more optical fibers of a plurality of optical fibers of an optical fiber cable, and a first photodetector positioned in the integrating sphere that is optically responsive over a first range of wavelengths, where the first photodetector is configured to receive at least one optical signal of the one or more optical signals, and output first data representative of the at least one optical signal. In an embodiment, the optical measurement device includes a second photodetector positioned in the integrating sphere and optically responsive over a second range of wavelengths that is different from the first range of wavelengths, where the first photodetector is configured to receive the at least one optical signal of the one or more optical signals, and output second data representative of the at least one optical signal. In an embodiment, the optical measurement device includes a sensor optically coupled to the integrating sphere and configured to receive the one or more optical signals and output data representative of one or more respective positions the one or more optical signals impinged on the sensor. In an embodiment, the optical measurement device includes a processor coupled to the photodetector and the sensor and configured to: receive the first and second data representative of the at least one optical signal; select one of the first and second data for determining an optical intensity associated with the at least one optical signal; determine, based on the selected one of the first and second data, the optical intensity associated with the at least one optical signal; receive the data representative of the one or more positions; and determine, based on the data representative of the one or more positions, a polarity of the optical fiber cable.

In an embodiment, the processor is configured to select one of the first and second data by at least: identifying a first optical intensity based on the first data representative of the at least one optical signal; identifying a second optical intensity based on the second data representative of the at least one optical signal; and selecting the first data when the first optical intensity is greater than the second optical intensity and select the second data when the second optical intensity is greater than the first optical intensity.

In an embodiment, the processor is configured to select one of the first and second data by at least: receiving an indication of a wavelength of the one or more optical signals; determine whether the wavelength is in the first range of wavelengths or the second range of wavelengths; and selecting the first data when the wavelength is in the first range of wavelengths and select the second data when the wavelength is in the second first range of wavelengths.

In an embodiment, the processor is configured to determine an optical loss associated with the at least one optical signal based on a difference between an optical transmission intensity of the at least one optical signal and the determined optical intensity of the at least one optical signal. In an embodiment, the processor is configured to: determine, based on the one or more positions, one or more positions in relation to the sensor on which the one or more optical signals respectively impinged on the sensor; determine, based on the one or more positions in relation to the sensor, one or more receiving positions of the one or more optical signals, respectively; determine an order in which the one or more optical signals respectively impinged on the sensor; and determine the polarity of the optical fiber cable based on the order and the one or more receiving positions.

In an embodiment, the processor is configured to: determine, based on the one or more positions, one or more positions in relation to the sensor on which the one or more optical signals respectively impinged on the sensor; determine, based on the one or more positions in relation to the sensor, one or more receiving positions of the one or more optical signals, respectively; and determine the polarity of the optical fiber cable based on the one or more receiving positions and one or more transmitting positions of the one or more optical signals, respectively.

In an embodiment, the processor is configured to identify the one or more transmitting positions based on unique signatures of the one or more optical signals, respectively. In an embodiment, the sensor is an image sensor and the optical measurement device further includes an illumination source configured to emit light for illuminating an optical connector of the optical fiber cable, where the image sensor is configured to capture an image of the illuminated optical connector and output the image, and the processor is configured to receive the image and analyze the image.

In an embodiment, analyzing the image includes determining at least one of a contamination level of the optical connector based on the image and a type of the optical connector based on a number of end-faces or an arrangement of the end-faces of the optical fiber cable identified based on the image. In an embodiment, the processor is configured to determine the polarity of the optical fiber cable based on an offset between a receiving position of an optical signal of the one or more optical signals and a corresponding transmitting position of the optical signal.

In an embodiment, the processor is configured to determine the polarity to be a first type if the receiving position is the same as the corresponding transmitting position. In an embodiment, the processor is configured to determine the polarity to be a second type if the receiving position is a pair-wise transpose of the corresponding transmitting position. In an embodiment, the processor is configured to determine the polarity to be a third type if the receiving position is a transpose in relation to the corresponding transmitting position.

In an embodiment, a method includes receiving one or more optical signals that respectively emanate from one or more optical fibers of a plurality of optical fibers of an optical fiber cable, where the one or more optical signals having a wavelength. In an embodiment, the method includes capturing one or more images of the one or more optical signals, determining, based on the one or more images, one or more receiving positions of the one or more optical signals, respectively, and determining a polarity of the optical fiber cable based on both the one or more receiving positions and one or more transmitting positions of the one or more optical signals, respectively. In an embodiment, when the wavelength is in a first optical responsivity range of a first photodetector, the method includes determining an optical intensity or loss of the one or more optical signals based on data representative of the optical intensity output by the first photodetector, and when the wavelength is in a second optical responsivity range of a second photodetector, the method includes determining an optical intensity or loss of the one or more optical signals based on data representative of the optical intensity output by the second photodetector, the first and second optical responsivity ranges being different.

In an embodiment, a method includes determining a first optical intensity based on the data representative of the optical intensity output by the first photodetector; determining a second optical intensity based on the data representative of the optical intensity output by the second photodetector; when the first optical intensity is greater than the second optical intensity, determining that the wavelength is in the first optical responsivity range of the first photodetector and determining the optical intensity or loss of the one or more optical signals based on the data representative of the optical intensity output by the first photodetector; and when the second optical intensity is greater than the first optical intensity, determining the optical intensity or loss of the one or more optical signals based on the data representative of the optical intensity output by the second photodetector.

In an embodiment, a method includes receiving an indication of the wavelength of the one or more optical signals. In an embodiment, a method includes when the wavelength is in the first optical responsivity range, commanding the first photodetector to cease measuring or outputting data representative of the optical intensity, and when the wavelength is in the second optical responsivity range, commanding the second photodetector to cease measuring or outputting data representative of the optical intensity. In an embodiment, determining the one or more receiving positions includes: determining, based on the one or more images, one or more positions in relation to the image sensor on which the one or more optical signals respectively impinged on the image sensor; and determining the one or more receiving positions based on the one or more positions in relation to the image sensor.

In an embodiment, a method includes emitting light for illuminating an optical connector of the optical fiber cable; capturing an image of the illuminated optical connector; and analyzing the image to determine a level of contamination of the optical connector. In an embodiment, analyzing the optical connector includes determining a type of the optical connector based on a number of end-faces or an arrangement of the end-faces identified based on the image.

DETAILED DESCRIPTION

Figure 1:
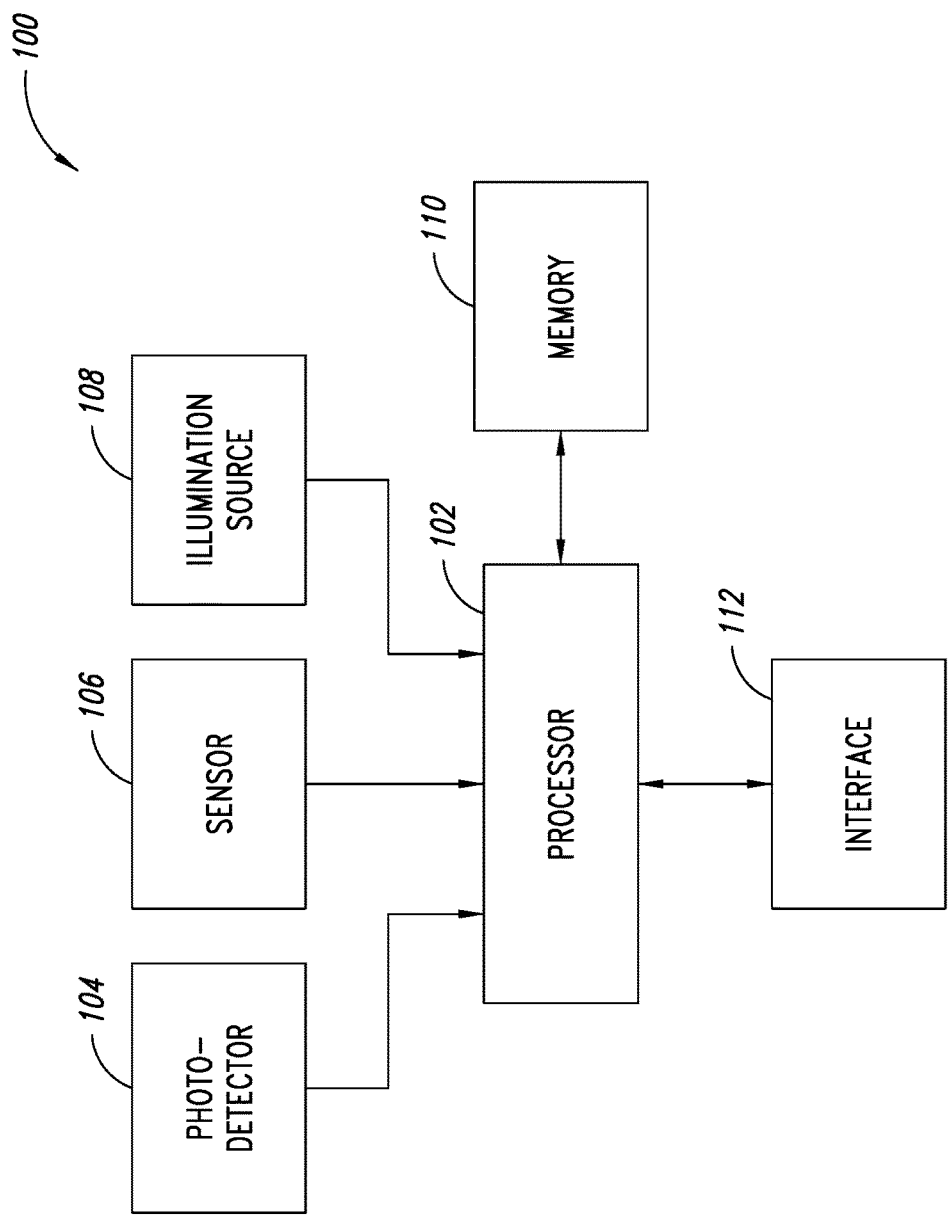
FIG. 1 shows a block diagram of an optical measurement device in accordance with an embodiment.

FIG. 1 shows a block diagram of an optical measurement device 100 in accordance with an embodiment. The optical measurement device 100 includes a processor 102, a photodetector 104, a sensor 106, an illumination source 108, a memory 110 and an interface 112. The photodetector 104, sensor 106, illumination source 108, memory 110 and interface 112 are communicatively coupled to the processor 102.

The photodetector 104 may be any type of light sensor. For example, the photodetector 104 may be a photosensor that includes one or more photodiodes. The photodetector 104 is configured to receive an optical signal, detect an optical intensity of the optical signal and output data representative of the optical signal or the optical intensity. The photodetector 104 may receive an optical signal emanating from an optical fiber of an optical fiber cable (not shown) and output data representative of the optical signal or the optical intensity thereof.

The sensor 106 may be any device that is configured to output data representative of a position that the optical signal impinged on the sensor 106. For example, the sensor 106 may be an image sensor that captures an image of the optical signal and outputs data representative of the image. The sensor 106 may, for example, be a camera. The sensor 106 is configured to capture an image of the optical signal emanating from the optical fiber. Further, the sensor 106 may capture an image of an illuminated end face of an optical fiber array or connector and output data representative of the image.

In addition, the sensor 106 may be an optical strip or an optical array. For example, the optical strip may be a linear photodiode array (such as, an indium gallium arsenide (InGaAs) photodiode array) of a 1×n dimension. The sensor 106 may also be a two-dimensional sensor matrix. The optical strip or optical array may receive the optical signal and output data representative of a position on which the optical signal impinged on the optical strip or the optical array. The position may be a position in a plane (for example, an x-y position or a position along a line).

The illumination source 108 may be any type of light source. For example, the illumination source 108 may be a light emitting diode (LED) or a laser source. The illumination source 108 emits light in order to illuminate the end face or the connector of an optical fiber or optical fiber array. When the end face is illuminated, the end face may be inspected for contamination. For example, the presence of contaminants, such as dust particles, at the end face may be detected when the end face is illuminated. Illuminating the end face or the connector enables capturing an image for contamination testing and type determination (for example, number of end faces and size and dimensions of the array).

The memory 110 may be any type of memory such as read-only memory (ROM), static random access memory (RAM) or dynamic RAM, among others. The memory 110 is configured to store executable instructions that, when executed by the processor 102, cause the processor 102 to perform the operations/techniques described herein. The memory 110 may also store data that is output by the photodetector 104 or the image sensor 106.

The processor 102 receives the data representative of the optical signal or the optical intensity thereof. The processor 102 determines an optical loss associated with transmission of the optical signal and stores the optical loss in the memory 110 and/or outputs the optical loss to the interface 112. As alternative to outputting the optical loss, the processor 102 may output the optical intensity for comparison with a known intensity of the optical signal as input to the optical fiber under test.

The processor 102 receives the data output by the sensor 106. For example, the data may be a captured image of the optical signal or a position on which the optical signal impinged. The processor 102 determines, based on the data, a polarity of the optical fiber cable from which optical signals are received by the sensor 106. The processor 102 may evaluate the image for inspecting a contamination of an optical fiber end face. The processor 102 may determine a contamination inspection result (for example, contamination level) based on the image. The processor 102 may also output the image for display, whereby the image may be evaluated by personnel using the optical measurement device 100. The processor 102 may also determine a connector type of the optical fiber cable as described in greater detail below. The processor 102 outputs the determined polarity, contamination inspection result and/or connector type to the interface 112.

The interface 112, which may be a display or a communication interface, among others, receives the optical loss, optical intensity, polarity and/or connector type information from the processor 102. When the interface 112 is a display, the interface may display an indication of the received optical loss, optical intensity, polarity, contamination inspection result and/or connector type to a user. When the interface 112 is a communication interface, interface 112 may transmit an indication of the received optical loss, optical intensity, polarity, contamination inspection result and/or connector type to another device.

Figure 2:
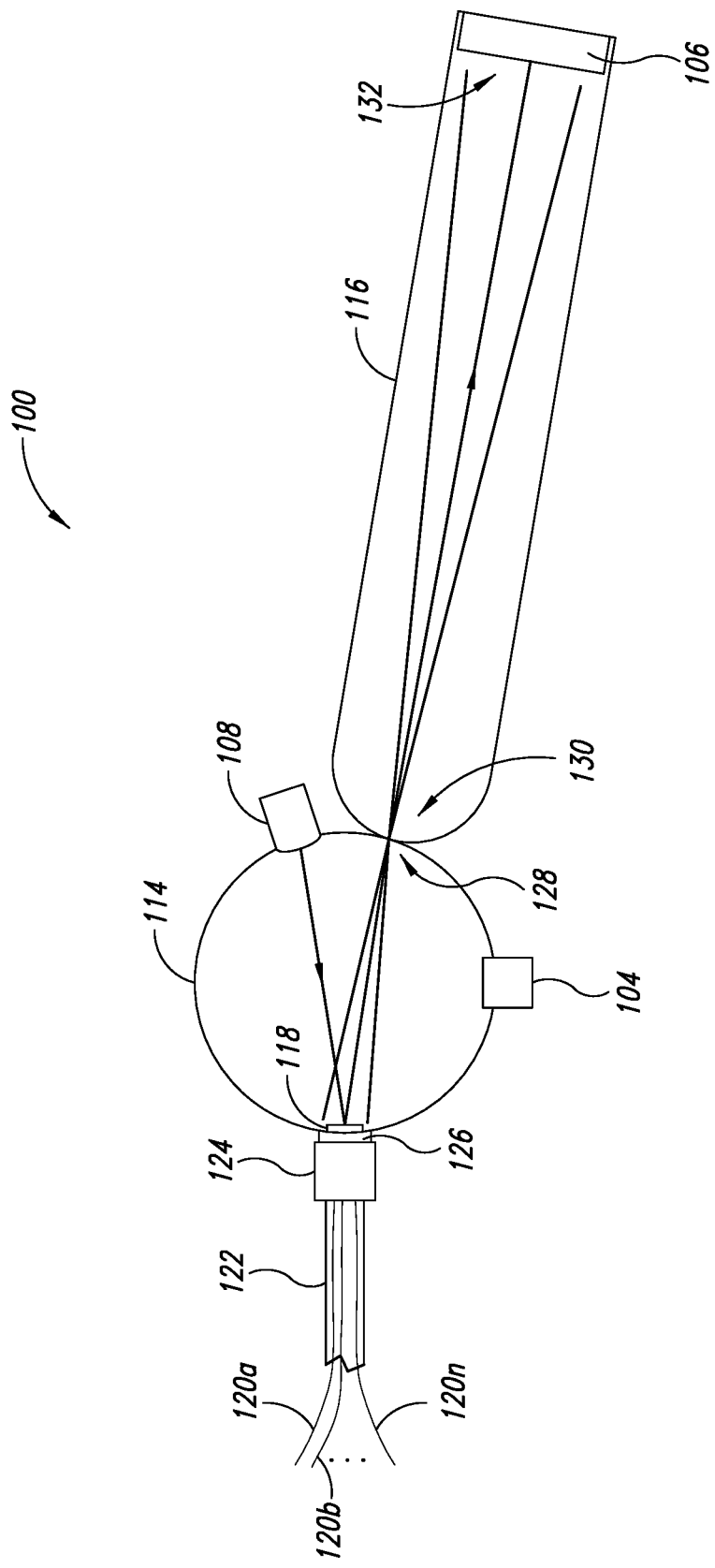
FIG. 2 is a pictorial diagram of the optical measurement device in accordance with an embodiment.

FIG. 2 is a pictorial diagram of the optical measurement device 100 in accordance with an embodiment. The optical measurement device 100 includes an integrating sphere 114, the photodetector 104, the illumination source 108, a chamber 116 and the sensor 106.

The integrating sphere 114 may be a hollow spherical cavity having a reflective interior. The integrating sphere 114 has an entry port 118 for receiving an optical signal of a plurality of optical signals that respectively emanate from a plurality of optical fibers 120a-n of an optical fiber cable 122. The optical fiber cable 122 may terminate at an optical connector 124. The integrating sphere 114 or the entry port 118 thereof may have a mechanical interface 126 for receiving the optical connector 124. The optical connector 124 may be connected to the mechanical interface 126. The mechanical interface 126 may secure the optical connector 124 to the integrating sphere 114 and allow optical fiber signals (or rays) emanating from the plurality of optical fibers 120a-n of the optical fiber cable 122 to reach the cavity of the integrating sphere 114. The mechanical interface 126 may be genderless and allow for connecting an optical connector 124 of any gender. Furthermore, the mechanical interface 126 may be sized and dimensioned to accept optical connectors having a variety of sizes.

The photodetector 104 is positioned in the integrating sphere 114. An optical signal that emanates from an optical fiber 120 of the plurality of optical fibers 120a-n is reflected inside the cavity of the integrating sphere 114 by virtue of the reflective interior. The optical signal ultimately reaches the photodetector 104. The photodetector 104 a detects an optical intensity of the optical signal as described herein and outputs data representative of the detected intensity.

The integrating sphere 114 has an aperture 128. The aperture 128 leads to the chamber 116. The aperture 128 blocks stray light and operates as an imaging device (for example, a lens). In an embodiment, the aperture 128 may be replaced by a lens or an equivalent of a lens. The aperture 128 may permit an optical signal that is being reflected within the integrating sphere 114 to exit the integrating sphere 114 and enter the chamber 116.

The chamber 116 may be a dark chamber. The chamber 116 may be any device that is configured to receive an optical signal at one end and allow the optical signal to project onto another end of the chamber 116. As shown in FIG. 2, a distal end 130 of the chamber 116 receives light exiting the integrating sphere 114 via the aperture 128. For example, the distal end 130 of the chamber 116 may have an aperture that receives the light exiting the integrating sphere 114 via the aperture 128 of the integrating sphere 114. As such, the chamber 116 and the integrating sphere 114 are optically coupled. The sensor 106 is disposed at a proximal of the chamber 116 and configured to capture the light entering the chamber 116.

The illumination source 108 may be positioned to emit light within the integrating sphere 114. The illumination source 108 may emit light to illuminate an end face of the optical connector 124. The emitted light may reach the end face of the optical connector 124 and reflect off of the end face. The reflected light then reaches the sensor 106 via the aperture 128 and the chamber 116.

The sensor 106 may capture an image of the end face of the optical connector 124. The sensor 106 then outputs data representative of the image to the processor 102 described with reference to FIG. 1. The processor 102 may analyze the image. The processor 102 determines a type of the optical connector 124 based on the image of the end face. Further, the processor 102 may determine a contamination level of the end face based on the image. The processor 102 may, for example, apply image processing techniques to determine the type of the optical connector based on the shape or arrangement, or other visually-perceptible features in the image. As will be described below, the type of the optical connector 124 may be uniquely determined based at least in part on an observed number of rows or columns of optical fiber end faces associated with the optical connector 124. Furthermore, the processor 102 may determine a contamination level of the end face of the optical connector 124 based on the image of the end face. In an embodiment, use of the chamber may be forgone. For example, the sensor 106 may be optically coupled to the integrating sphere 114 via a lens.

In an embodiment, another optical component may be used in place of the integrating sphere 114. For example, the integrating sphere 114 may be replaced with a diffuser or another optical component.

Figure 3:
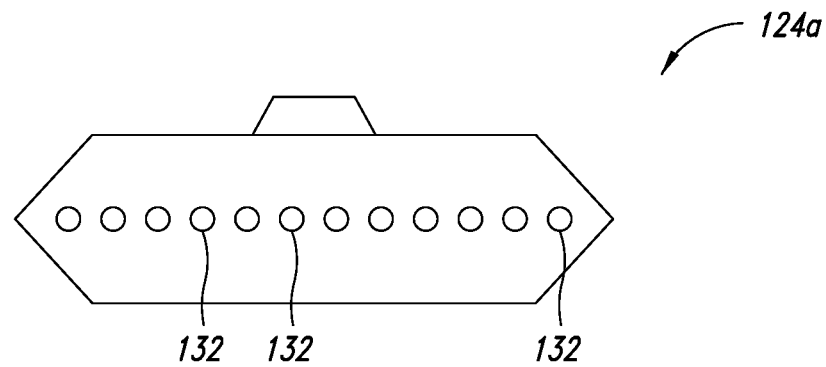
FIG. 3 shows an illustration of various optical connector types.
Figure 3:
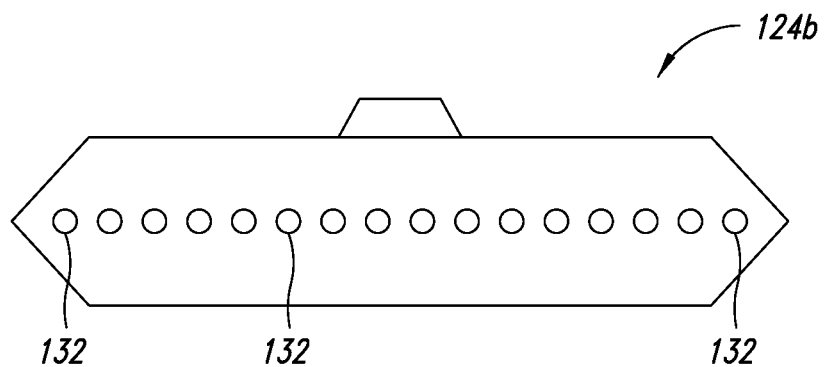
Figure 3:
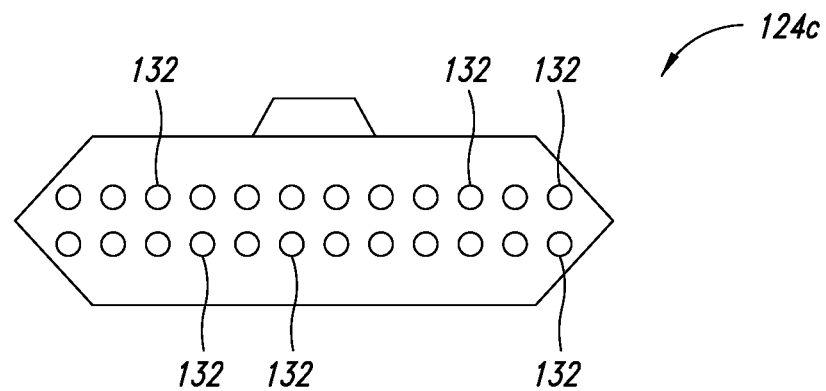

FIG. 3 shows an illustration of various optical connector types. A first optical connector 124a includes an array of twelve end faces 132 in one row. The first optical connector 124a may accordingly be characterized as having a 1×12 array of end faces 132. A second optical connector 124b includes an array of sixteen end faces 132 in one row. The second optical connector 124b may accordingly be characterized has having a 1×16 array of end faces 132. The third optical connector 124c includes two rows each having twelve end faces 132. The third optical connector 124c may accordingly be characterized as having a 2×12 array of end faces 132.

Referring back to FIG. 2, the processor 102 may evaluate the image of the end faces of the optical connector 124 to determine the arrangement of end faces of the optical connector 124. The processor 102 may determine the type of the optical connector 124 based at least in part on the determined arrangement of end faces. Furthermore, the processor 102 may determine the type of the optical connector 124 based at least in part on an observed size of the optical connector 124 or end faces thereof or a distance between the end faces of the optical connector 124. For example, the processor 102 may compare the image to images of known arrangements stored in the memory 110. Based on the comparison, the processor 102 may identify a known image having a greatest degree of similarity to the captured image. The type of optical connector or arrangement of end faces may be determined to be that of the identified known image.

When the sensor 106 is an image sensor, one or more images captured by the sensor 106 may be used to determine a polarity of the optical fiber cable 122. The sensor 106 captures one or more images of optical signals emanating from one or more of the plurality of optical fiber cables 120a, 120b, 120c, . . . , 120n. The processor 102 may determine a receiving position of the optical signals with respect to the optical connector 124. The polarity of the optical fiber cable 122 may be determined based at least in part on the determined receiving position of the optical signals and a known transmitting position of the optical signals that are input to the optical fibers of the optical fiber cable 122. The optical signals emitted for determining polarity and contamination level and the optical signals emitted for determining power loss or intensity measurements may have different wavelengths. The signals may be visible light signals or infrared signals. Furthermore, the sensor 106 may be responsive to visible light signals.

Further, the sensor 106 may be an optical strip or an optical array. The sensor 106 may output data representative of a position on which the optical signal impinged on the sensor 106. The position may be a position in a plane (for example, an x-y position or a position along a line). The processor 102 may determine the polarity of the optical fiber cable 122 based at least in part on the position the optical signals impinged on the sensor 106 and a known transmitting position of the optical signals that are input to the optical fibers of the optical fiber cable 122.

Figure 4:
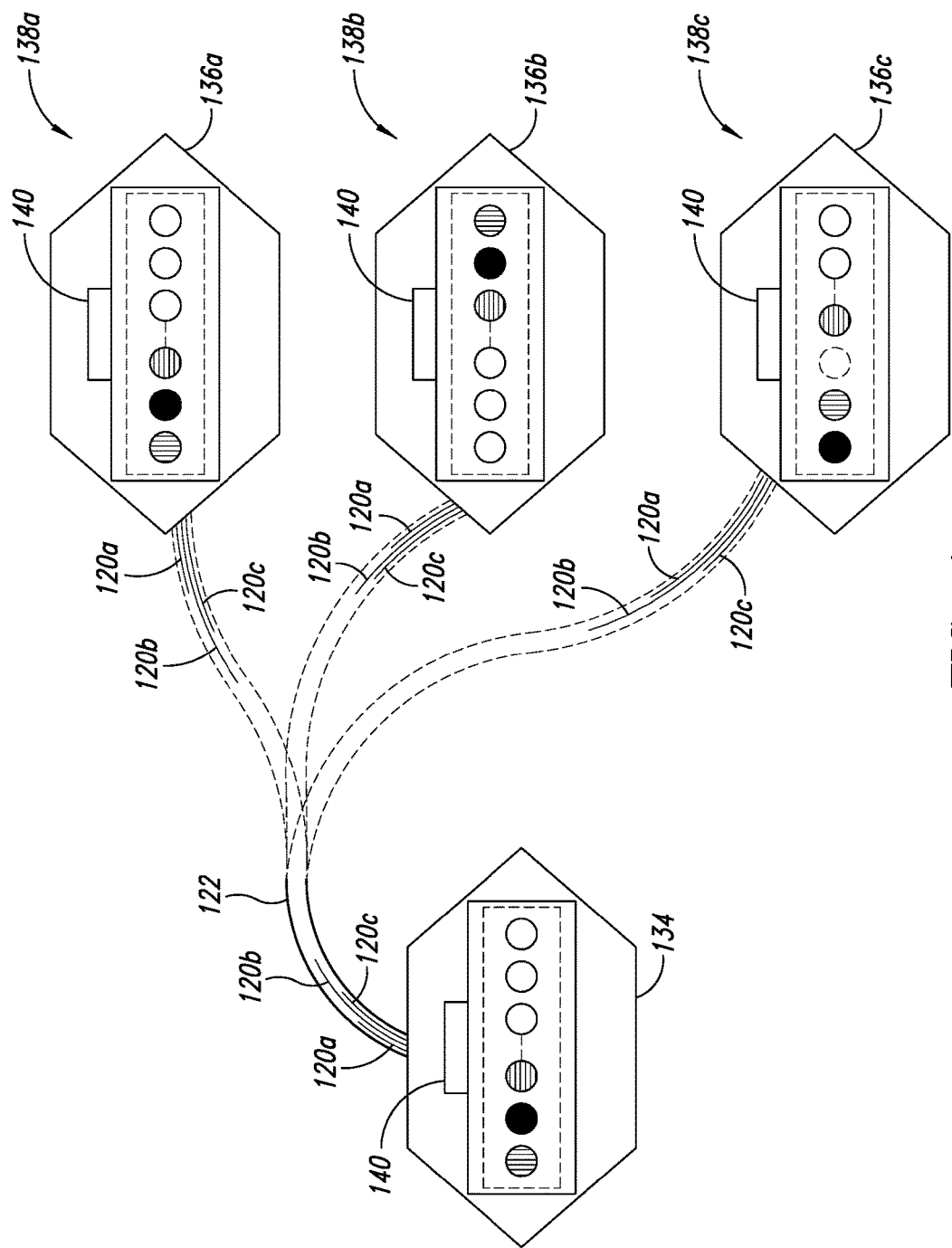
FIG. 4 shows an illustration of optical fiber array polarity.

FIG. 4 shows an illustration of optical fiber array polarity. In FIG. 4, an optical connector 134 of a transmitting end of an optical fiber cable 122 is shown, along with three optical connectors 136a, 136b, 136c of a receiving end of the optical fiber cable 122 according to three polarity types. The polarity of an optical connector 136a, 136b, 136c refers to a relationship between a transmitting position in the optical connector 134 of the transmitting end of the optical fiber cable 122 and a receiving position in the optical connector 136 of the receiving end of the optical fiber cable.

A first optical connector 136a has a first polarity 138a (known as a "Type A" polarity as defined by the American National Standards Institute/Telecommunications Industry Association 568 specification (ANSI/TIA-568)). According to the first polarity 138a, a receiving position of an optical signal is the same as a transmitting position of the optical signal. The transmitting and receiving positions may be referenced by a key 140 of the optical connectors 134, 136. For example, a first position may be the leftmost position in relation to the key 140 and a second position may be the second position from the left in relation to the key 140 and so on. Although optical connectors 134, 136 comprising one row of end faces are described with reference to FIG. 4, it is noted that in other embodiments optical connectors may have more than one row of optical fiber end faces.

A second optical connector 136b has a second polarity 138b (known as a "Type B" polarity). According to the second polarity 138b, a receiving position of an optical signal is transposed with respect to a transmitting position. Accordingly, an optical signal that is transmitted into an optical fiber at the leftmost position with respect to the key 140 will be received at the rightmost position with respect to the key 140 on the optical connector 136b of the receiving end. Similarly, an optical signal that is transmitted into an optical fiber at the position that is third from left with respect to the key 140 on the transmitting and will be received at the position that is third from right on the receiving end.

A third optical connector 136c has a third polarity 138c (known as a "Type C" polarity). According to the third polarity 138c, a receiving position of the optical signal will be pairwise transposed with respect to the transmitting position. Accordingly, an optical signal that is transmitted into an optical fiber at the leftmost position with respect to the key 140 on the transmitting and will be received at the second position from the left with respect to the key 140 and vice-versa. Similarly, an optical signal that is transmitted into an optical fiber at a position that is third from left with respect to the key 140 on the transmit side will be received at the position that is fourth from the left in the receive-side.

Referring back to FIG. 2, data representative of a position on which optical signals impinged on the sensor 106 (for example, one or more images captured by the sensor 106) may be used to determine a receiving position of an optical signal in the optical connector 124. Once the receiving position is determined, the polarity of the optical fiber cable 122 may be determined by the processor 102 based on the receiving position as well as the known transmitting position of the optical signal.

Figure 5:
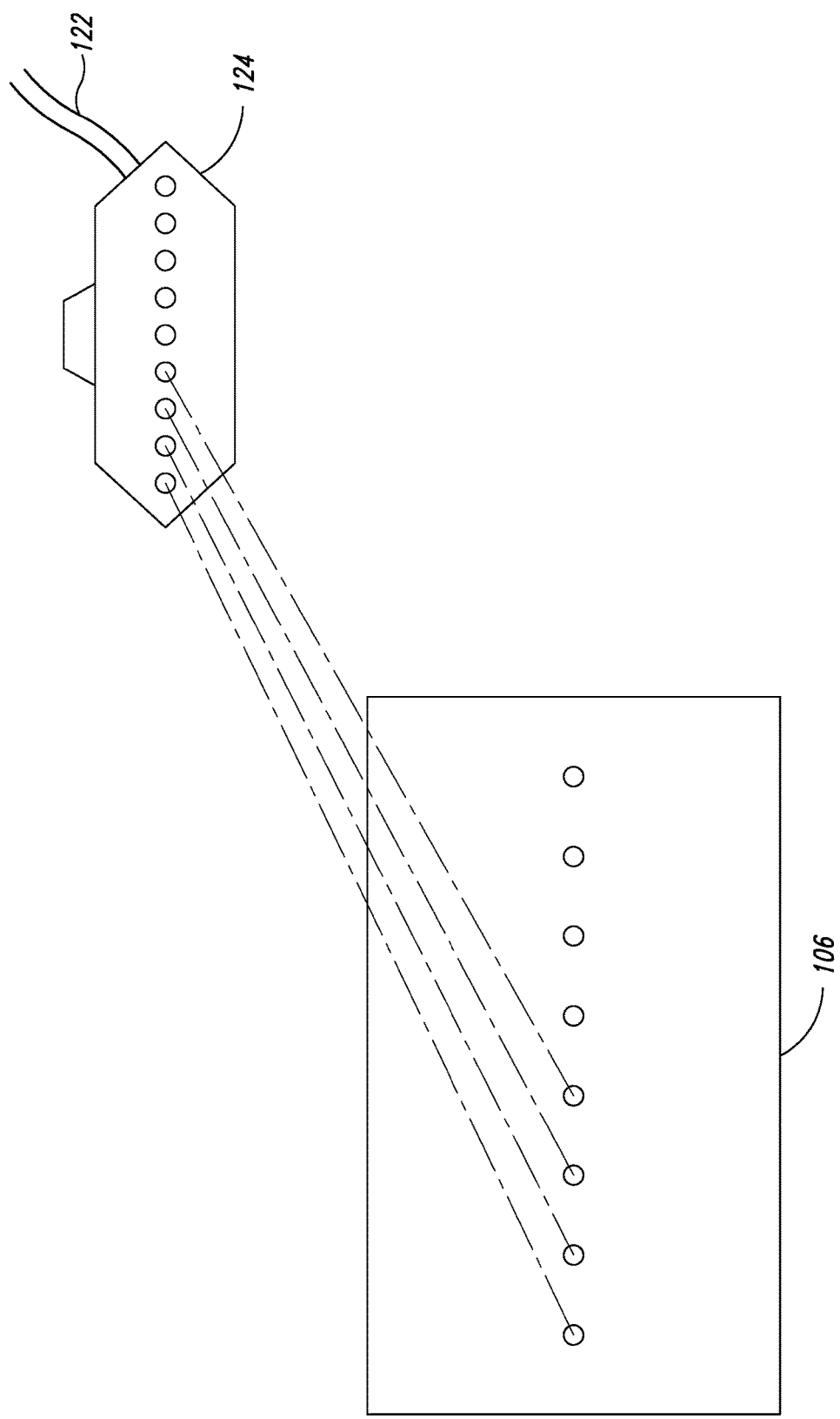
FIG. 5 shows an illustration of an image sensor receiving optical signals emanating from an optical connector.

FIG. 5 shows an illustration of a sensor 106 receiving optical signals emanating from an optical connector 124. It is noted that for ease of description, the transposing effect of the aperture 128 on the optical signals received by the image sensor 106 is ignored in FIG. 5.

The sensor 106 may receive optical signals emanating from the optical connector 124. The sensor 106 outputs data representative of a position on which optical signals impinged on the sensor 106. The data may be one or more images of optical signals emanating from the optical connector 124. The data or the one or more images may be used to determine, for each optical signal, a position in relation to the sensor 106 on which the optical signal impinged. The position on which the optical signal impinged the sensor 106 is indicative of the receiving position on the optical connector 124.

Furthermore, the data may be used to determine an order in which the optical signals were received. The order may be determined based on a timing of receipt of an optical signal in relation to other optical signals. For example, the sensor 106 may capture a plurality of images sequentially over time. The order of receipt of an optical signal in relation to other optical signals may be determined based on an order, in the sequence of images, of the image in which the optical signal was identified.

To test the plurality of optical fibers 120 in the optical fiber cable 122, a testing convention may be adopted. While testing the optical fiber cable 122, optical signals may be transmitted over the plurality of optical fibers 120 in a particular order. For example, the optical signals may be transmitted over the plurality of optical fibers 120 sequentially from a leftmost transmitting position to a rightmost transmitting position. If the receiving order of the optical fiber signals was determined to be from a leftmost receiving position to a rightmost receiving position, then the polarity of the optical fiber cable 122 may be determined to be the first polarity 138a described with reference to FIG. 4. Conversely, if the receiving order was determined to be from a rightmost receiving position to a leftmost receiving position, then the polarity of the optical fiber cable 122 may be determined to be the second polarity 138b described with reference to FIG. 4. Alternatively, if the receiving order was determined to be pairwise transposed in relation to the transmitting order, then the polarity of the optical fiber cable 122 may be determined to be the third polarity 138c described with reference to FIG. 4.

As an alternative to using the transmitting and receiving order described herein as a testing convention, an optical signal transmitted over a particular transmitting position may have a unique signature. The signature may be based on a modulation of the optical signal or a wavelength associated with the optical signal. For example, the optical signal transmitted over a particular transmitting position may be modulated using a unique on-off keying pattern, among others. Alternatively or in addition, the optical signal transmitted over a particular transmitting position may have a unique wavelength. The signature may be apriori known to the optical measurement device 100.

The signature of a received optical signal may be determined based on images captured by the sensor 106. For example, an on-off keying pattern of the received optical signal may be identified based on a sequence of images captured by the sensor 106. Furthermore, the wavelength of the received optical signal in the visible light spectrum may be identified based on a colored image of the received optical signal.

The signature of the received optical signal may be used to correlate the receiving position of the optical signal with the known transmitting position of the optical signal. As described herein, the receiving position of the optical signal may be determined based on a location or a position on the sensor 106 on which the optical signal impinged. The transmitting and receiving positions are then used to determine the polarity of the optical fiber cable 122.

Figure 6:
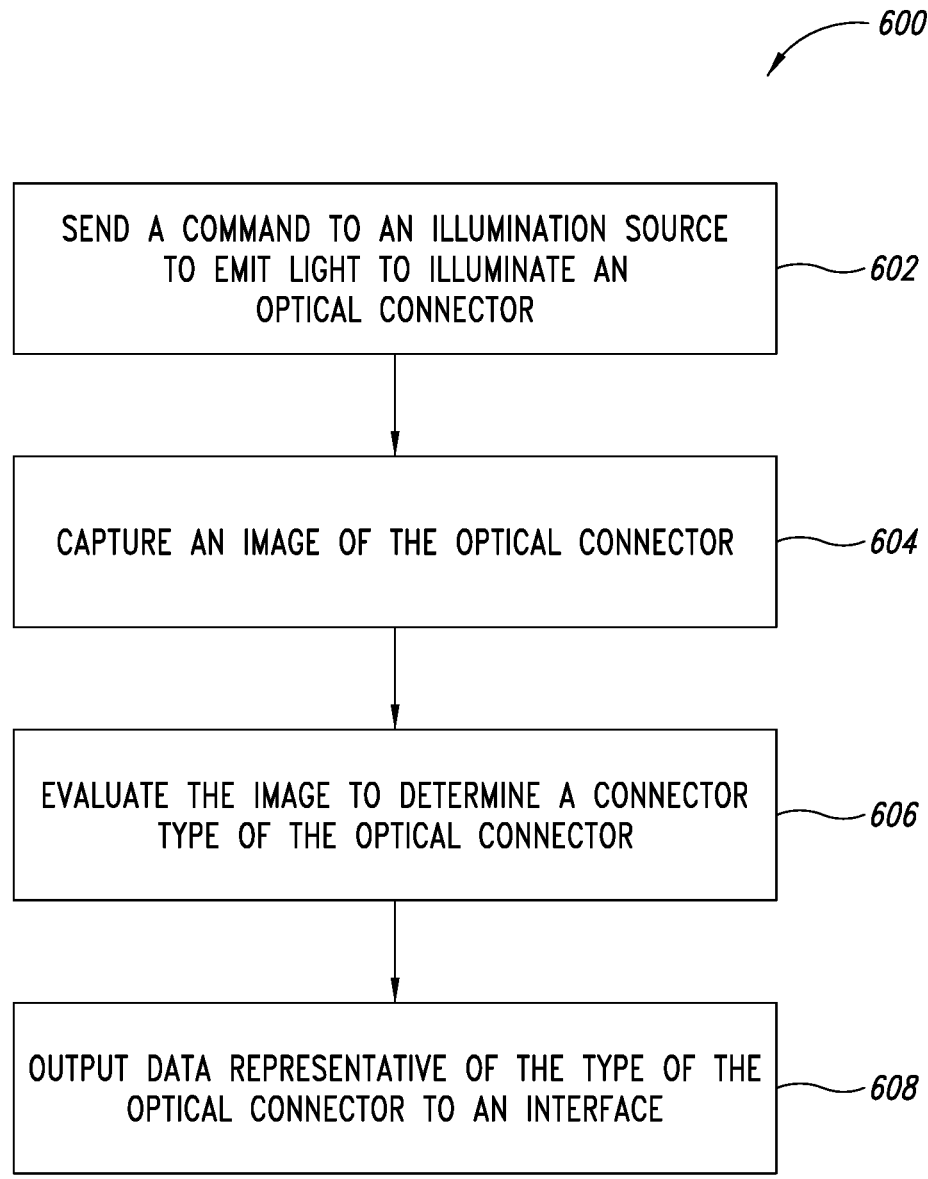
FIG. 6 shows a flow diagram of a method for determining a type of an optical connector.

FIG. 6 shows a flow diagram of a method 600 for determining a type of an optical connector 124. At 602, a processor, such as the processor 102 described with reference to FIG. 1, sends a command to an illumination source, such as the illumination source 108 described with reference to FIG. 1, to emit light to illuminate an optical connector 124. At 604, an image sensor, such as the sensor 106 described with reference to FIG. 1, captures an image of the optical connector 124. The image sensor outputs data representative of the captured image to the processor. At 606, the processor evaluates the image to determine a connector type of the optical connector.

For example, the processor may compare the image to images of known arrangements stored in the memory 110. Based on the comparison, the processor 102 may identify a known image having a greatest degree of similarity to the captured image. The type of optical connector may be determined to be that of the identified known image. At 608, the processor outputs data representative of the type of the optical connector to an interface, such as the interface 112 described with reference to FIG. 1.

Figure 7:
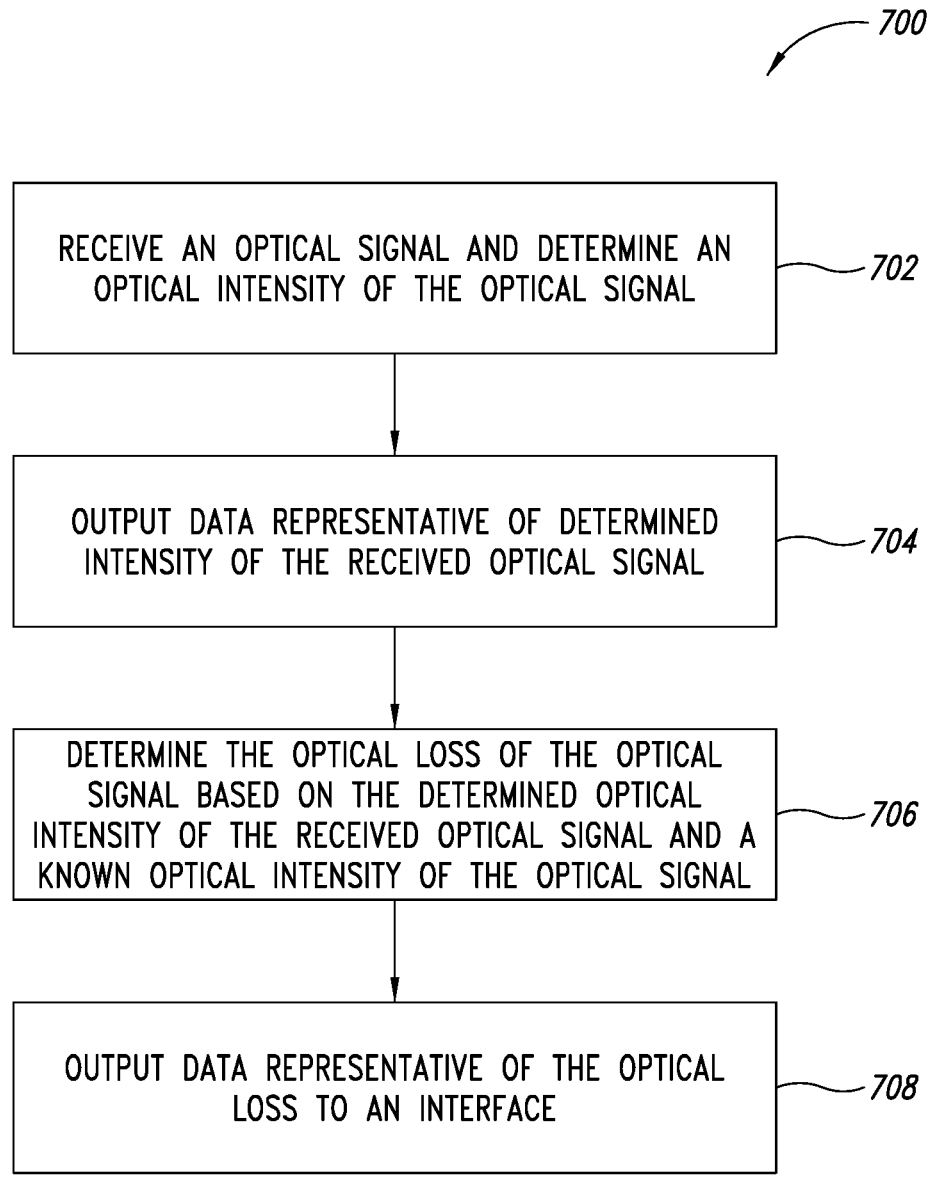
FIG. 7 shows a flow diagram of a method for determining an optical loss in transmission of an optical signal.

FIG. 7 shows a flow diagram of a method 700 for determining an optical loss in transmission of an optical signal. At 702, a photodetector, such as the photodetector 104 described with reference to FIG. 1, receives an optical signal and determines an optical intensity of the received optical signal. The photodetector outputs data representative of the determined intensity of the optical signal to a processor at 704. The processor, at 706, determines the optical loss of the optical signal based on the determined optical intensity of the received optical signal and a known optical intensity of the optical signal as transmitted. At 708, the processor outputs data representative of the optical loss to an interface, such as the interface 112 described with reference to FIG. 1.

Figure 8:
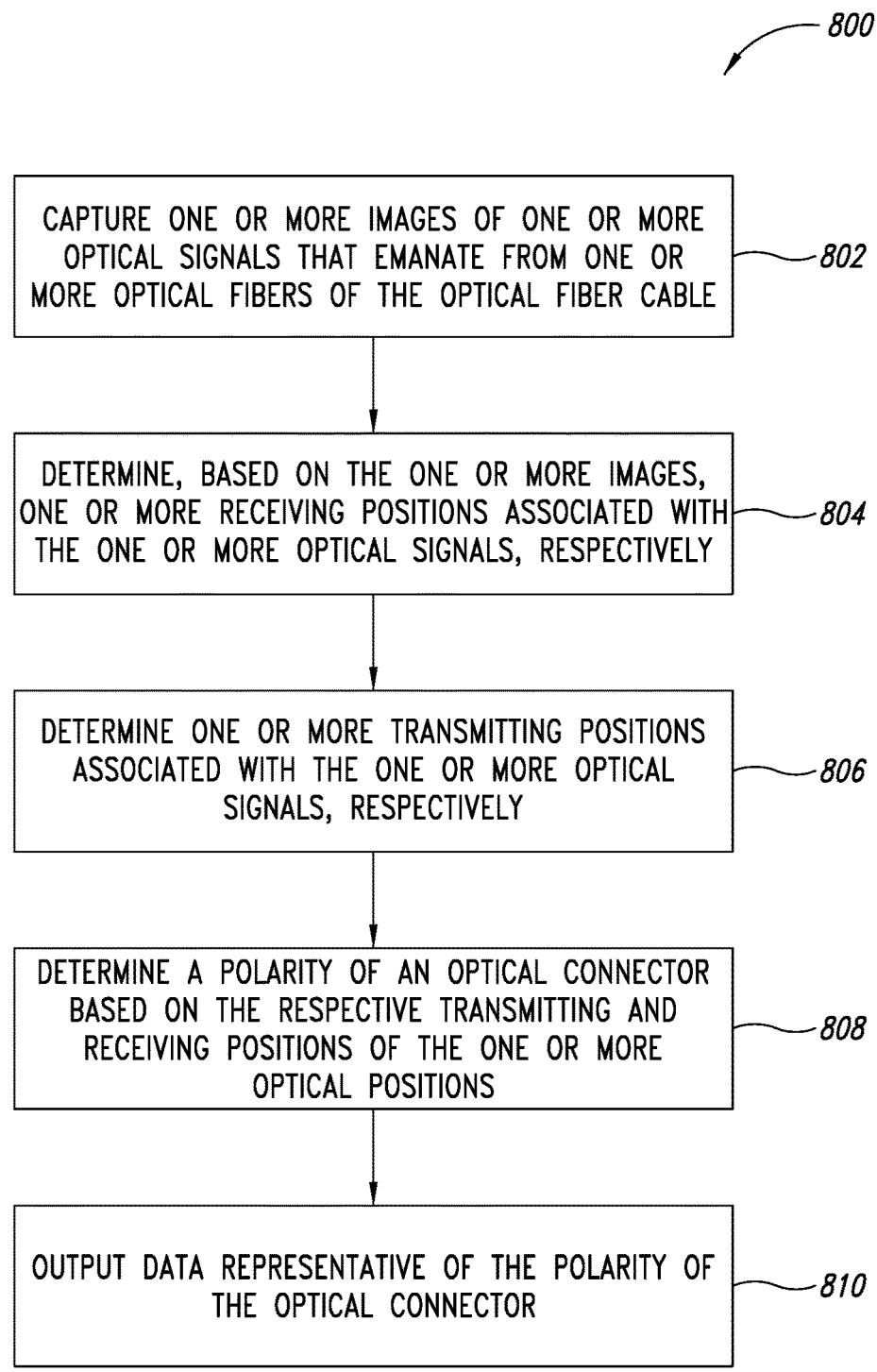
FIG. 8 shows a flow diagram of a method for determining a polarity of an optical connector of an optical fiber cable.

FIG. 8 shows a flow diagram of a method 800 for determining a polarity of an optical connector of an optical fiber cable. At 802, an image sensor captures one or more images of one or more optical signals that emanate from one or more optical fibers of the optical fiber cable. The image sensor outputs, to a processor, data representative of the one or more images. At 804, the processor determines, based on the one or more images, one or more receiving positions associated with the one or more optical signals, respectively. For example, the processor may determine the one or more receiving positions based at least in part on positions at which the optical signals impinged on the image sensor.

At 806, the processor determines one or more transmitting positions associated with the one or more optical signals, respectively. The transmitting positions may be determined based on an order in which the one or more optical signals were received in relation to an order in which the one or more optical signals were known to be transmitted. The transmitting positions may also be determined and correlated with the receiving positions based at least in part on one or more signatures respectively associated with the one or more optical signals. The one or more signatures may be determined based on the captured images. At 808, the processor determines a polarity of the optical connector based on the respective transmitting and receiving positions of the one or more optical signals. At 810, the processor outputs data representative of the polarity of the optical connector.

Figure 9:
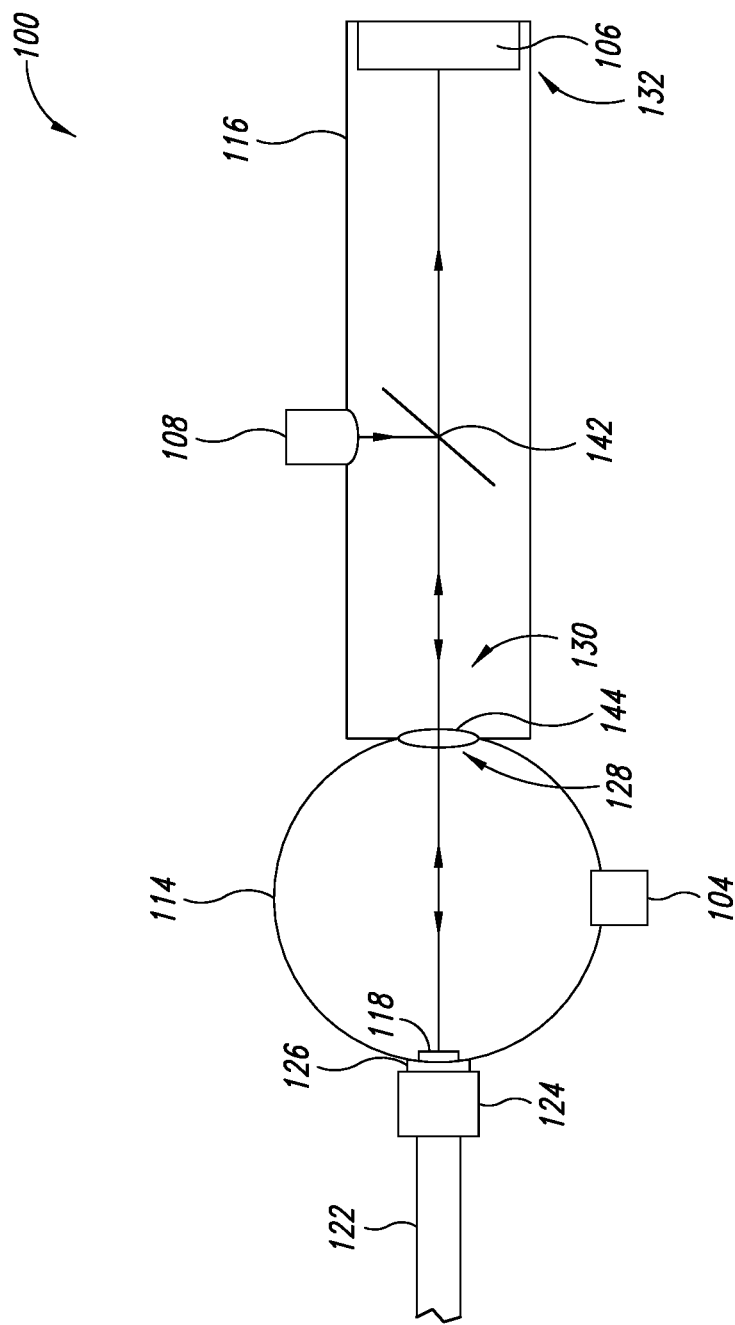
FIG. 9 shows an optical measurement device in accordance with an embodiment.

FIG. 9 shows the optical measurement device 100 in accordance with an embodiment. Similar elements of the optical measurement device 100 as described with reference to the optical measurement device 100 in FIG. 2 have the same reference numerals. The illumination source 108 of the optical measurement device 100 is positioned in the chamber 116. A beam splitter 142 is also positioned in the chamber 116. The beam splitter 142 reflects the light emitted by the illumination source 108 onto the optical connector 124. The beam splitter 142 permits light reflecting from the optical connector 124 to pass through the beam splitter and reach the sensor 106. In addition, the optical measurement device 100 is equipped with a lens 144. The lens 144 is positioned at the aperture 128. The lens 144 helps direct and focus light from the integrating sphere 114 into the dark chamber 116. The lens 144 focuses a front face image of optical connector 124 on the sensor 106. When the optical fibers under test are active, light is focused on the sensor 106 and polarity can be determined. When the Illumination source 108 is active connector face contamination (focused by the lens 144) can be viewed by the sensor 106.

In an embodiment, the sensor 106 may be a sensor array that senses both (x,y) positions of the locations where optical signals impinge on the sensor 106 and the intensity of the optical signals. Because the sensor 106 can make an intensity measurement, use of the photodetector 104 may be forgone, and the sensor 106 may be used for both position and intensity determination. The sensor 106 may be used with or without the dark chamber 116. If the dark chamber 116 is not used, the sensor 106 may be optically coupled to the aperture 128. Examples of the sensor 106 include the Hamamatsu G12430 series InGaAs photodiode array.

The optical fiber cable 122 may be a multimode optical fiber cable and the optical fibers 120a-n of the optical fiber cable 122 may be multimode optical fibers. The optical fiber cable 122 may, alternatively, be a singlemode optical fiber cable. As a multimode optical fiber cable, the optical fiber cable 122 (or the optical fibers 120a-n thereof) may carry optical signals having a wide range of wavelengths. For example, the optical fiber cable 122 may carry wavelengths of 850 nanometers (nm) or 1300 nm, among others. Conversely, a singlemode optical fiber may carry optical signals having longer wavelengths than the multimode optical fiber. For example, a singlemode optical fiber may carry optical signals having wavelengths of 1310 or 1550 nm, among others.

The optical measurement device 100 may be configured to detect the optical intensity of optical signals over a wide range of wavelengths, such as those in a wavelength range of use of a multimode optical fiber. The optical measurement device 100 may also determine the polarity of multimode optical fiber cables.

Figure 10:
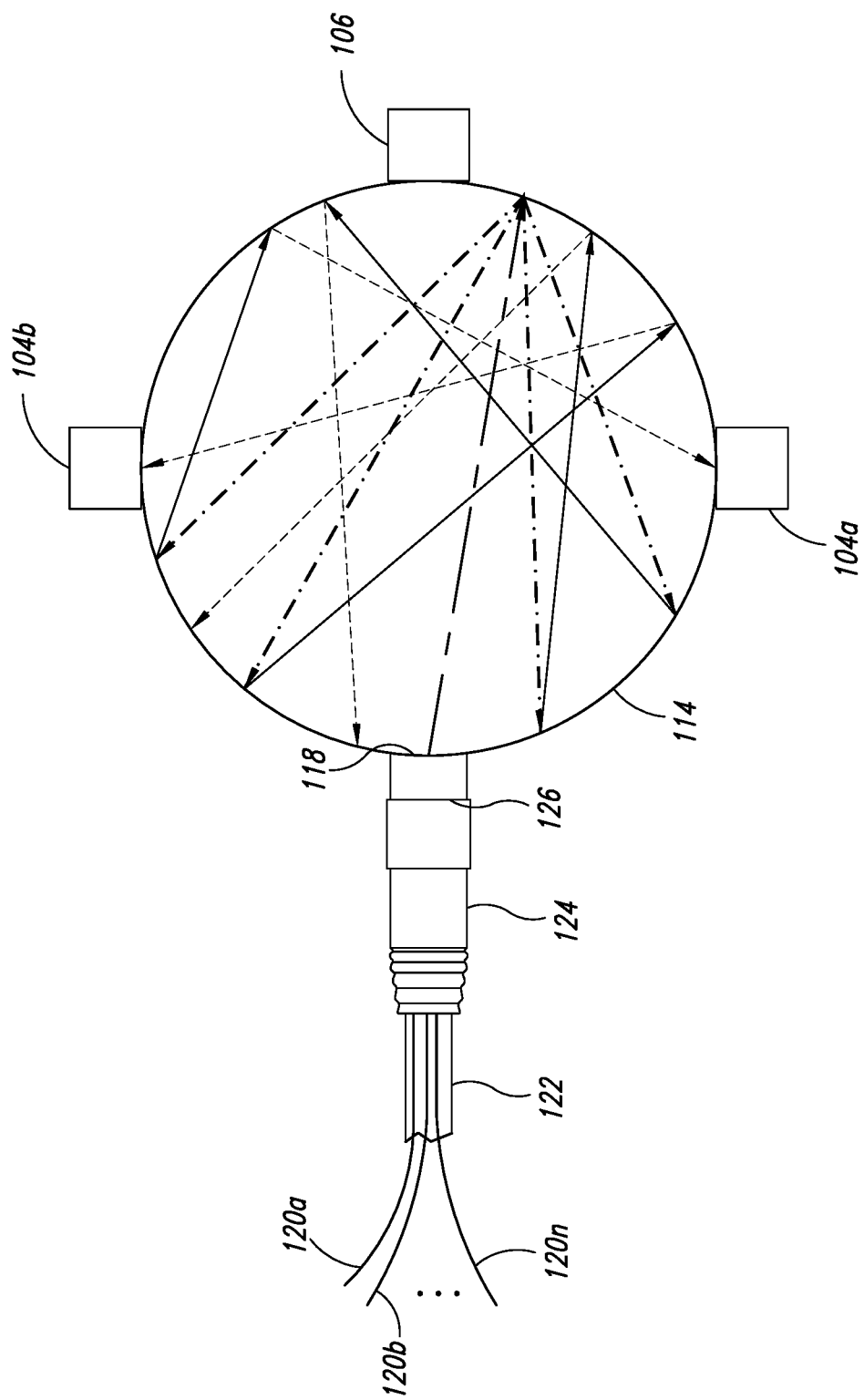
FIG. 10 shows an optical measurement device in accordance with an embodiment.

FIG. 10 shows an optical measurement device in accordance with an embodiment. Similar elements of the optical measurement device 100 described with reference to FIG. 10 as those of the optical measurement device 100 described with reference to FIG. 2 have the same reference numerals. The optical measurement device 100 includes two photodetectors 104a, 104b. It is noted that although the optical measurement device 100 is described herein as including two photodetectors 104a, 104b, the optical measurement device 100 may include any number of photodetectors. Similar to the photodetector 104 described with reference to FIG. 1, the two photodetectors 104a, 104b are communicatively to the processor 102. The photodetectors 104a, 104b are each configured to receive an optical signal, detect an optical intensity of the optical signal and output data representative of the optical signal or the optical intensity to the processor 102.

The photodetectors 104a, 104b may be of different types and they (or their respective optical sensing areas) may be made of different materials, such as silicon (Si) or indium gallium arsenide (InGaAs), among others. The photodetectors 104a, 104b may have different wavelength responsivity or photosensitivity. For example, a first photodetector 104a may be an InGaAs photodetector and may, accordingly, be optically responsive to wavelengths in a first range of wavelengths between 1000 nm and 1500 nm. A second photodetector 104b may be a silicon photodetector and may be optically responsive to wavelengths in a second range of wavelengths of 500 nm to 1000 nm. The first and second ranges are different and may be partially overlapping or non-overlapping.

A photodetector 104a, 104b may be said to be responsive to a wavelength if the photodetector 104a, 104b has responsivity, for example, as measured in amperes per watt (A/W), that exceeds a threshold. The threshold may be 0.2 A/W, among others. The photodetector 104a, 104b may be said to be responsive to a wavelength if the responsivity of the photodetector 104a, 104b for the wavelength exceeds the threshold. Conversely, the photodetector 104a, 104b may be said to be non-responsive to the wavelength if the responsivity of the photodetector 104a, 104b for the wavelength does not exceed the threshold.

A responsivity of 0.2 A/W or higher allows for reliably detecting optical signals (and their associated optical intensity). If the responsivity is below 0.2 A/W, for example, the photodetector 104a, 104b may not reliably detect the optical intensity of optical signals that impinge on the photodetector 104a, 104b because much of the optical signal power is not received by the photodetector 104a, 104b.

When the optical fiber cable 122 is a multimode cable, it may be used to carry optical signals having various wavelengths, such as 850 nm or 1300 nm. Accordingly, the optical fiber cable 122 may be tested over the wavelengths for which it may be used. Due to the difference between the wavelengths (of 450 nm in the example above) there may not be a single commercially viable photodetector that is responsive to all wavelengths transmitted over the multimode cable or optical fibers thereof.

By using the photodetectors 104a, 104b, the optical measurement device 100 may reliably detect the optical intensity of the optical signals of various wavelengths. For example, the first photodetector 104a, which is optically responsive to wavelengths between 1000 nm and 1500 nm, may be used to detect the optical intensity of optical test signals having wavelengths between 1000 nm and 1500 nm, such as optical test signals having a wavelength of 1300 nm. Further, the second photodetector 104b, which is optically responsive to wavelengths in the range of 500 nm to 1000 nm, may be used to detect the optical intensity of optical test signals having wavelengths between 500 nm and 1000 nm, such as optical test signals having a wavelength of 850 nm.

As shown in FIG. 10, the photodetectors 104a, 104b are positioned in the integrating sphere 114. An optical signal that emanates from an optical fiber 120 of the plurality of optical fibers 120a-n is reflected inside the cavity of the integrating sphere 114 by virtue of the reflective interior of the integrating sphere 114. The optical signal ultimately reaches the photodetectors 104a, 104b.

The photodetectors 104a, 104b detect an optical intensity of the optical signal as described herein and output data representative of the detected intensity. Because of their different responsivity to the wavelength of the optical signal, one of the photodetectors 104a, 104b (whose range of responsivity includes the wavelength of the optical signal) output an electrical signal (or data) representing a higher optical intensity than the other photodetector 104a, 104b.

As described herein, the photodetectors 104a, 104b each output data representative of the detected optical intensity to the processor 102. The processor 102 may receive the data representative of the detected optical intensity output by each of the photodetectors 104a, 104b. The processor 102 determines, based on the detected optical intensity output by each of the photodetectors 104a, 104b, an optical loss associated with the transmitted optical signal and stores the optical loss in the memory 110 and/or outputs the optical loss to the interface 112. For example, the processor 102 may compare both detected optical intensities and select a higher of the two optical intensities as being representative of the detected optical intensity. Selection of the higher of the two detected optical intensities may be due to the fact that the lower of the detected intensities is attributable to a low responsivity of the associated photodetector rather than a low optical intensity. The photodetector 104a, 104b having a higher responsivity is associated with a higher detected intensity.

Alternatively, the processor 102 may receive an indication of the wavelength of the optical signal or determine the wavelength of the optical signal. The indication of the wavelength may be received from a test device emitting the optical signal. The processor 102 may use the data output by the corresponding photodetector 104a, 104b (or photodetector 104a, 104b having the higher responsivity for the wavelength) for determining the optical intensity or loss.

For example, if the wavelength of the optical signal is in the first range of wavelengths of the first photodetector 104a, the processor 102 may use the data output by the first photodetector 104a for determining the optical signal intensity or loss. Conversely, if the wavelength of the optical signal is in the second range of wavelengths of the second photodetector 104b, the processor 102 may use the data output by the second photodetector 104b for determining the optical signal intensity or loss.

The processor 102 may ignore the data output by the one photodetector 104a, 104b having a respective range of wavelengths that does not include the optical signal's wavelength. Alternatively, the processor 102 may turn off the one photodetector 104a, 104b or instruct the one photodetector 104a, 104b to cease measuring or outputting optical intensity such that the processor 102 does not receive data from the one photodetector 104a, 104b. As another alternative, the processor 102 may instruct the one photodetector 104a, 104b having the respective range of wavelengths that does not include the optical signal's wavelength not to output data when the processor 102 determines that the optical signal's wavelength is outside the one photodetector's 104a, 104b respective range. Accordingly, the processor 102 may only receive and evaluate data from the photodetector 104a, 104b whose respective range includes the optical signal's wavelength.

It is noted that reflection of optical signal inside the cavity of the integrating sphere 114 reduces the signal's intensity or power. Accordingly, using a photodetector 104a, 104b with a higher responsivity to the signal's wavelength may be advantageous as is counteracts the degradation in the signal's intensity or power resulting from the reflection.

As shown in FIG. 10, the sensor 106 may be positioned in the integrating sphere 114 such that an optical signal reflected in the cavity of the integrating sphere 114 impinges on the sensor 106. The sensor 106 may output data representative of a position on which optical signals impinged on the sensor 106. The data may be used for determining the polarity of the optical fiber cable 122 as described herein.

Although the optical measurement device 100 shown in FIG. 10 does not include the chamber 116, in various embodiments a chamber may be provided so that an optical signal exiting the integrating sphere 114 via an aperture arrives in the chamber.

The optical measurement device 100 may include an illumination source (not shown in FIG. 10) as described herein. The illumination source may emit light for illuminating the optical connector 124 of the optical fiber cable 122. The sensor 106, which may be an image sensor, may capture an image of the illuminated optical connector 124 and output the image to the processor 102. As described herein, the processor 102 may receive and analyze the image. For example, the processor 102 may analyze the image and determines a contamination level of the optical connector 127 or an optical connector type. The processor 102 may determine the optical connector type based on a number of end-faces or an arrangement of the end-faces of the optical fiber cable identified from the image.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An optical measurement device comprising:
   an integrating sphere configured to receive one or more optical signals that respectively emanate from one or more optical fibers of a plurality of optical fibers of an optical fiber cable;
   a first photodetector positioned in the integrating sphere and being optically responsive over a first range of wavelengths, the first photodetector being configured to receive at least one optical signal of the one or more optical signals, and output first data representative of the at least one optical signal;
   a second photodetector positioned in the integrating sphere and being optically responsive over a second range of wavelengths that is different from the first range of wavelengths, the first photodetector being configured to receive the at least one optical signal of the one or more optical signals, and output second data representative of the at least one optical signal;
   a sensor positioned in the integrating sphere and configured to receive the one or more optical signals and output data representative of one or more respective positions the one or more optical signals impinged on the sensor; and
   a processor coupled to the first photodetector, the second photodetector and the sensor and configured to:
      receive the first and second data representative of the at least one optical signal;

select one of the first and second data for determining an optical intensity associated with the at least one optical signal;
determine, based on the selected one of the first and second data, the optical intensity associated with the at least one optical signal;
receive the data representative of the one or more positions; and
determine, based on the data representative of the one or more positions, a polarity of the optical fiber cable.

2. The optical measurement device of claim 1, wherein the processor is configured to select one of the first and second data by at least:
identifying a first optical intensity based on the first data representative of the at least one optical signal;
identifying a second optical intensity based on the second data representative of the at least one optical signal; and
selecting the first data when the first optical intensity is greater than the second optical intensity and selecting the second data when the second optical intensity is greater than the first optical intensity.

3. The optical measurement device of claim 1, wherein the processor is configured to select one of the first and second data by at least:
receiving an indication of a wavelength of the one or more optical signals;
determine whether the wavelength is in the first range of wavelengths or the second range of wavelengths; and
selecting the first data when the wavelength is in the first range of wavelengths and selecting the second data when the wavelength is in the second range of wavelengths.

4. The optical measurement device of claim 1, wherein the processor is configured to determine an optical loss associated with the at least one optical signal based on a difference between an optical transmission intensity of the at least one optical signal and the determined optical intensity of the at least one optical signal.

5. The optical measurement device of claim 1, wherein the processor is configured to:
determine, based on the one or more positions, one or more positions in relation to the sensor on which the one or more optical signals respectively impinged on the sensor;
determine, based on the one or more positions in relation to the sensor, one or more receiving positions of the one or more optical signals, respectively;
determine an order in which the one or more optical signals respectively impinged on the sensor; and
determine the polarity of the optical fiber cable based on the order and the one or more receiving positions.

6. The optical measurement device of claim 1, wherein the processor is configured to:
determine, based on the one or more positions, one or more positions in relation to the sensor on which the one or more optical signals respectively impinged on the sensor;
determine, based on the one or more positions in relation to the sensor, one or more receiving positions of the one or more optical signals, respectively; and
determine the polarity of the optical fiber cable based on the one or more receiving positions and one or more transmitting positions of the one or more optical signals, respectively.

7. The optical measurement device of claim 6, wherein the processor is configured to identify the one or more transmitting positions based on unique signatures of the one or more optical signals, respectively.

8. The optical measurement device of claim 1, wherein the sensor is an image sensor and wherein the optical measurement device further comprises an illumination source configured to emit light for illuminating an optical connector of the optical fiber cable;
wherein the image sensor is configured to capture an image of the illuminated optical connector and output the image; and
wherein the processor is configured to receive the image and analyze the image.

9. The optical measurement device of claim 8, wherein analyzing the image includes determining at least one of a contamination level of the optical connector based on the image and a type of the optical connector based on a number of end-faces or an arrangement of the end-faces of the optical fiber cable identified based on the image.

10. The optical measurement device of claim 1, wherein the processor is configured to determine the polarity of the optical fiber cable based on an offset between a receiving position of an optical signal of the one or more optical signals and a corresponding transmitting position of the optical signal.

11. The optical measurement device of claim 10, wherein the processor is configured to determine the polarity to be a first type if the receiving position is the same as the corresponding transmitting position.

12. The optical measurement device of claim 10, wherein the processor is configured to determine the polarity to be a second type if the receiving position is a pair-wise transpose of the corresponding transmitting position.

13. The optical measurement device of claim 10, wherein the processor is configured to determine the polarity to be a third type if the receiving position is a transpose in relation to the corresponding transmitting position.

14. A method comprising:
receiving one or more optical signals that respectively emanate from one or more optical fibers of a plurality of optical fibers of an optical fiber cable, the one or more optical signals having a wavelength;
capturing one or more images of the one or more optical signals;
determining, based on the one or more images, one or more receiving positions of the one or more optical signals, respectively;
determining a polarity of the optical fiber cable based on both the one or more receiving positions and one or more or transmitting positions of the one or more optical signals, respectively; and
when the wavelength is in a first optical responsivity range of a first photodetector, determining an optical intensity or loss of the one or more optical signals based on data representative of the optical intensity output by the first photodetector, and when the wavelength is in a second optical responsivity range of a second photodetector, determining an optical intensity or loss of the one or more optical signals based on data representative of the optical intensity output by the second photodetector, the first and second optical responsivity ranges being different.

15. The method of claim 14, comprising:
determining a first optical intensity based on the data representative of the optical intensity output by the first photodetector;

determining a second optical intensity based on the data representative of the optical intensity output by the second photodetector;

when the first optical intensity is greater than the second optical intensity, determining that the wavelength is in the first optical responsivity range of the first photodetector and determining the optical intensity or loss of the one or more optical signals based on the data representative of the optical intensity output by the first photodetector; and when the second optical intensity is greater than the first optical intensity, determining the optical intensity or loss of the one or more optical signals based on the data representative of the optical intensity output by the second photodetector.

16. The method of claim 14, comprising:

receiving an indication of the wavelength of the one or more optical signals.

17. The method of claim 16, comprising:

when the wavelength is in the first optical responsivity range, commanding the first photodetector to cease measuring or outputting data representative of the optical intensity, and when the wavelength is in the second optical responsivity range, commanding the second photodetector to cease measuring or outputting data representative of the optical intensity.

18. The method of claim 14, wherein determining the one or more receiving positions includes:

determining, based on the one or more images, one or more positions in relation to an image sensor on which the one or more optical signals respectively impinged on the image sensor; and determining the one or more receiving positions based on the one or more positions in relation to the image sensor.

19. The method of claim 14, comprising:

emitting light for illuminating an optical connector of the optical fiber cable;

capturing an image of the illuminated optical connector; and analyzing the image to determine a level of contamination of the optical connector.

20. The method of claim 19, wherein analyzing the optical connector includes determining a type of the optical connector based on a number of end-faces or an arrangement of the end-faces identified based on the image.

* * * * *